United States Patent
Marigliano et al.

(10) Patent No.: US 10,237,400 B2
(45) Date of Patent: Mar. 19, 2019

(54) METHOD AND SYSTEM FOR ESTIMATING THE MAXIMUM SPEED SUSTAINABLE BY A BROADBAND COMMUNICATION LINE

(71) Applicant: TELECOM ITALIA S.p.A., Milan (IT)

(72) Inventors: Flavio Marigliano, Turin (IT); Marco Polano, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/574,709

(22) PCT Filed: May 18, 2015

(86) PCT No.: PCT/EP2015/060846
§ 371 (c)(1),
(2) Date: Nov. 16, 2017

(87) PCT Pub. No.: WO2016/184489
PCT Pub. Date: Nov. 24, 2016

(65) Prior Publication Data
US 2018/0295231 A1   Oct. 11, 2018

(51) Int. Cl.
| H04M 1/24 | (2006.01) |
| H04M 3/08 | (2006.01) |
| H04M 3/22 | (2006.01) |
| H04M 3/30 | (2006.01) |
| H04L 12/26 | (2006.01) |
| H04M 11/06 | (2006.01) |

(52) U.S. Cl.
CPC ........ *H04M 3/306* (2013.01); *H04L 43/0876* (2013.01); *H04L 43/0888* (2013.01); *H04M 3/2209* (2013.01); *H04M 11/062* (2013.01)

(58) Field of Classification Search
CPC . H04L 12/2869; H04L 12/2878; H04L 41/06; H04L 41/5025; H04L 41/5067; H04L 41/0896; H04L 43/0829; H04L 43/04; H04L 43/062; H04L 43/0888; H04L 43/10; H04L 47/22; H04L 47/24; H04B 3/54
USPC .......... 379/1.01, 1.03, 1.04, 9, 10.01, 15.01, 379/22.08, 23, 24
See application file for complete search history.

(56) References Cited

U.S. PATENT DOCUMENTS

| 7,391,780 B1 | 6/2008 | Stone et al. |
| 2003/0112763 A1 | 6/2003 | Liu et al. |

(Continued)

FOREIGN PATENT DOCUMENTS

| EP | 2 645 633 A1 | 10/2013 |
| WO | WO 2014/185895 A1 | 11/2014 |

OTHER PUBLICATIONS

International Search Report dated Feb. 3, 2016 in PCT/EP2015/060846 filed May 18, 2015.

(Continued)

*Primary Examiner* — Binh Kien Tieu
(74) *Attorney, Agent, or Firm* — Oblon, McCleland, Maier & Neustadt, L.L.P.

(57) ABSTRACT

A method for estimating, in a broadband communication system including an access network and a plurality of broadband communication lines associated with the access network, a sustainable speed that can be sustained by a selected broadband communication line of the plurality of lines.

13 Claims, 2 Drawing Sheets

(56) References Cited

U.S. PATENT DOCUMENTS

| | | | |
|---|---|---|---|
| 2005/0174938 A1* | 8/2005 | Richardson | H04Q 11/0478 370/230.1 |
| 2008/0070527 A1* | 3/2008 | Betge-Brezetz | H04L 41/12 455/187.1 |
| 2015/0003596 A1* | 1/2015 | Croot | H04L 43/0829 379/93.08 |
| 2015/0063141 A1 | 3/2015 | Rohlfing et al. | |
| 2017/0118091 A1* | 4/2017 | Townend | H04L 41/5067 |
| 2017/0317937 A1* | 11/2017 | Dillon | H04L 47/22 |

OTHER PUBLICATIONS

Written Opinion dated Feb. 3, 2016 in PCT/EP2015/060846 filed May 18, 2015.

\* cited by examiner

METHOD AND SYSTEM FOR ESTIMATING THE MAXIMUM SPEED SUSTAINABLE BY A BROADBAND COMMUNICATION LINE

BACKGROUND OF THE INVENTION

Field of the Invention

The present invention generally relates to broadband communication systems, and more particularly to broadband communication lines—such as ADSL ("Asymmetric Digital Subscriber Line"), ADSL2, ADSL2+ or VDSL2 ("Very-high-bit-rate Digital Subscriber Line") lines (hereinafter, xDSL lines). Even more particularly, the present invention relates to a method and system for estimating maximum speeds (bit-rates) sustainable by xDSL lines of an access network.

Overview of the Related Art

Activation of a xDSL service on xDSL lines is usually preceded by a marketability analysis (qualification) aimed at estimating a maximum speed that can be sustained by each xDSL line (hereinafter, qualification speed), so that a xDSL service requiring a minimum speed for usability thereof can be activated on all the xDSL lines whose qualification speed is higher than the required minimum speed.

However, the estimated qualification speed (which dates back to the xDSL service activation) could be not valid in the long term, i.e. it could not ensure that a customer of the xDSL service experiences a same quality of service over time. Indeed, the maximum speed that can be sustained by each xDSL line may decrease over time with respect to the respective estimated qualification speed, e.g. due to the increase in the number of xDSL services in the access network (and hence in the noise experienced by each xDSL line) or due to degradation of cables' physical characteristics.

The maximum speed that can be sustained by the xDSL line in the long term (hereinafter, maximum sustainable speed) is usually estimated based on evaluation of "loop makeup" of the xDSL line (i.e. cable physical characteristics, such as type, section, and/or insulation, that determine xDSL line attenuation) and/or on evaluation of noise affecting the xDSL line (mainly due to crosstalk, i.e. electromagnetic interference between xDSL lines associated with a same cable).

CA2281208, "Single-ended subscriber loop qualification for xdsl service", discloses evaluating the "loop makeup" of a xDSL line based on consultation of xDSL service provider databases relating to infrastructure inventory.

U.S. Pat. No. 6,292,539, "Method and apparatus for digital subscriber loop qualification", discloses evaluating xDSL line attenuation based on reflectometry measurements.

Philip Golden, Hervé Dedieu, and Krista Jacobsen: "*Fundamentals of DSL Technology*", and ITU-T G.992.3 Recommendation: "*Asymmetric digital subscriber line transceivers 2 (ADSL2)*" disclose evaluating noise affecting a xDSL line by means of predefined noise models based on number, type and power spectral density of noisy systems and on crosstalk between these noisy systems and the xDSL line affected by noise.

SUMMARY OF INVENTION

The Applicant has recognized that none of the cited prior arts solutions is satisfactory.

As far as xDSL line "loop makeup" evaluation is concerned, both use of xDSL service provider databases relating to infrastructure inventory (hereinafter, inventory databases), as disclosed in CA2281208, and use of reflectometry measurements, as disclosed in U.S. Pat. No. 6,292,539, have drawbacks in terms of accuracy and complexity.

Indeed, the inventory databases typically provide information about physical characteristics of cables (or cable portions) between xDSL service provider plants and the customer premises—and this information is used to evaluate the "loop makeup" and attenuation of the xDSL line. However, this information is often incomplete or, sometimes, is not updated as a result of infrastructure changes. Moreover, only average (i.e., typical) cable physical characteristics are available, which does not take into account non-negligible differences among cables due to manufacturing tolerances, installation and aging thereof.

Reflectometry measurements, typically intended to overcome these limitations, can instead result in the need to put the xDSL line out of service for measurement purposes (especially when reflectometry measurements make use of the same frequencies spectrum used to transmit signals over the xDSL line), or the need of a technician on the field and/or of interaction with the customer (as reflectometry measurements may be strongly affected by customer equipment).

As far as evaluation of noise affecting the xDSL line is concerned, the predefined noise models (such as those disclosed in "*Fundamentals of DSL Technology*" and "*Asymmetric digital subscriber line transceivers 2 (ADSL2)*") are conservative (as underestimating the xDSL line speed) and poorly flexible (as being not adaptable to specific conditions of different access network portions), thus preventing xDSL service activation on a significant percentage of xDSL lines that instead would allow that.

In view of the above, the Applicant has tackled the problem of devising a simple and effective solution aimed at easily, accurately and reliably estimating the maximum speed that can be sustained by a xDSL line in the long term, thereby preventing wrong non-activation of a xDSL service on a significant percentage of xDSL lines that instead would allow that.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies *mutatis mutandis* to any other aspect).

More specifically, one aspect of the present invention relates to a method for estimating, in a broadband communication system comprising an access network and a plurality of broadband communication lines associated with the access network, a sustainable speed that can be sustained by a selected broadband communication line of said plurality. The method comprises:

for each broadband communication line of said plurality, monitoring, at monitoring time instants, an attainable speed that can be attained over the line;

for each broadband communication line of said plurality, determining an attainable speed change that affects the broadband communication line over a monitoring time period comprising a plurality of said monitoring time instants;

grouping the broadband communication lines of said plurality into lines groups, each lines group comprising lines associated with a same access network portion and sharing at least one line property;

determining, for each lines group, an expected maximum attainable speed change based on a statistic of the attainable speed changes that affect the broadband communication lines of the lines group over said monitoring time period; and estimating the sustainable speed of the selected broadband communication line based on the respective attainable speeds monitored at said plurality of said monitoring time instants of said monitoring time period, and on the expected maximum attainable speed change determined for the lines group which the selected broadband communication line belongs to.

According to an embodiment of the present invention, said determining, for each lines group, an expected maximum attainable speed change comprises:

determining a cumulative distribution of the attainable speeds changes of the broadband communication lines of the lines group, and determining a predefined percentile of said cumulative distribution.

According to an embodiment of the present invention, said determining an attainable speed change that affect the broadband communication line over a monitoring time period comprises determining, among the attainable speeds monitored over said monitoring time period, minimum and maximum attainable speeds, and wherein said determining, for each lines group, an expected maximum attainable speed change comprises determining, for each broadband communication line of the lines group, a difference between said maximum and minimum attainable speeds, said determining a cumulative distribution of the attainable speeds changes of the broadband communication lines of the lines group comprising determining a cumulative distribution of the differences between said maximum and minimum attainable speeds of the broadband communication lines of the lines group.

According to an embodiment of the present invention, said estimating the sustainable speed of the selected broadband communication line comprises:

subtracting the expected maximum attainable speed change of the lines group which the selected broadband communication line belongs to from the maximum attainable speed of the selected broadband communication line.

According to an embodiment of the present invention, said estimating the sustainable speed of the selected broadband communication line comprises, after said subtracting:

applying a frame overhead associated with the selected broadband communication line.

According to an embodiment of the present invention, said at least one line property comprises a mean attainable speed of the broadband communication line.

According to an embodiment of the present invention, said at least one line property further comprises at least one among:

access type and noise margin target of the broadband communication line; and mean attenuation of the broadband communication line.

According to an embodiment of the present invention, said grouping the broadband communication lines of said plurality into lines groups comprises providing a quantized mean attainable speed for each broadband communication line of said plurality, said at least one line property comprising said quantized mean attainable speed of the broadband communication line.

According to an embodiment of the present invention, said grouping the broadband communication lines of said plurality into lines groups further comprises providing a quantized mean attenuation for each broadband communication line of said plurality, and wherein said at least one line property further comprises said quantized mean attenuation of the broadband communication line.

According to an embodiment of the present invention, said at least one line property further comprises access type and noise margin target of the broadband communication line.

According to an embodiment of the present invention, said monitoring is carried out by accessing "Management Information Bases" of DSLAM devices of the broadband communication system.

Another aspect of the present invention relates to a computer program product directly loadable into a memory of a computer, the computer program product comprising software code means adapted to perform said method when run on the computer.

A further aspect of the present invention relates to a broadband communication system comprising an access network and a plurality of broadband communication lines associated with the access network, the system further comprising:

a module for monitoring, at monitoring time instants, an attainable speed that can be attained over each broadband communication line of said plurality;

a module for determining, for each broadband communication line of said plurality, an attainable speed change that affects the broadband communication line over a monitoring time period comprising a plurality of monitoring time instants;

a module for grouping the broadband communication lines of said plurality into lines groups, each lines group comprising broadband communication lines associated with a same access network portion and sharing at least one line property, and for determining, for each lines group, an expected maximum attainable speed change based on a statistic of the attainable speed changes that affect the broadband communication lines of the lines group over said monitoring time period; and a module for estimating a sustainable speed of a selected broadband communication line of said plurality based on the attainable speeds monitored at said plurality of said monitoring time instants of said monitoring time period for the selected broadband communication line, and on the expected maximum attainable speed change determined for the lines group which the selected broadband communication line belongs to.

Thanks to the present invention, the maximum sustainable speed that can be sustained in the long term by a xDSL line is easily and precisely determined/evaluated/estimated based on current conditions of the access network (or of a portion thereof) and on statistical indications of xDSL line performance. Thus, activation of a xDSL service on a xDSL line may take place only when xDSL service quality can be ensured over time, thus avoiding unsatisfied customers withdrawing from a xDSL service whose quality is not ensured any longer.

BRIEF DESCRIPTION OF THE ANNEXED DRAWINGS

These and other features and advantages of the present invention will be made apparent by the following description of some exemplary and non limitative embodiments thereof; for its better intelligibility, the following description should be read making reference to the attached drawings, wherein.

DETAILED DESCRIPTION OF PREFERRED EMBODIMENTS OF THE INVENTION

Figure 1:
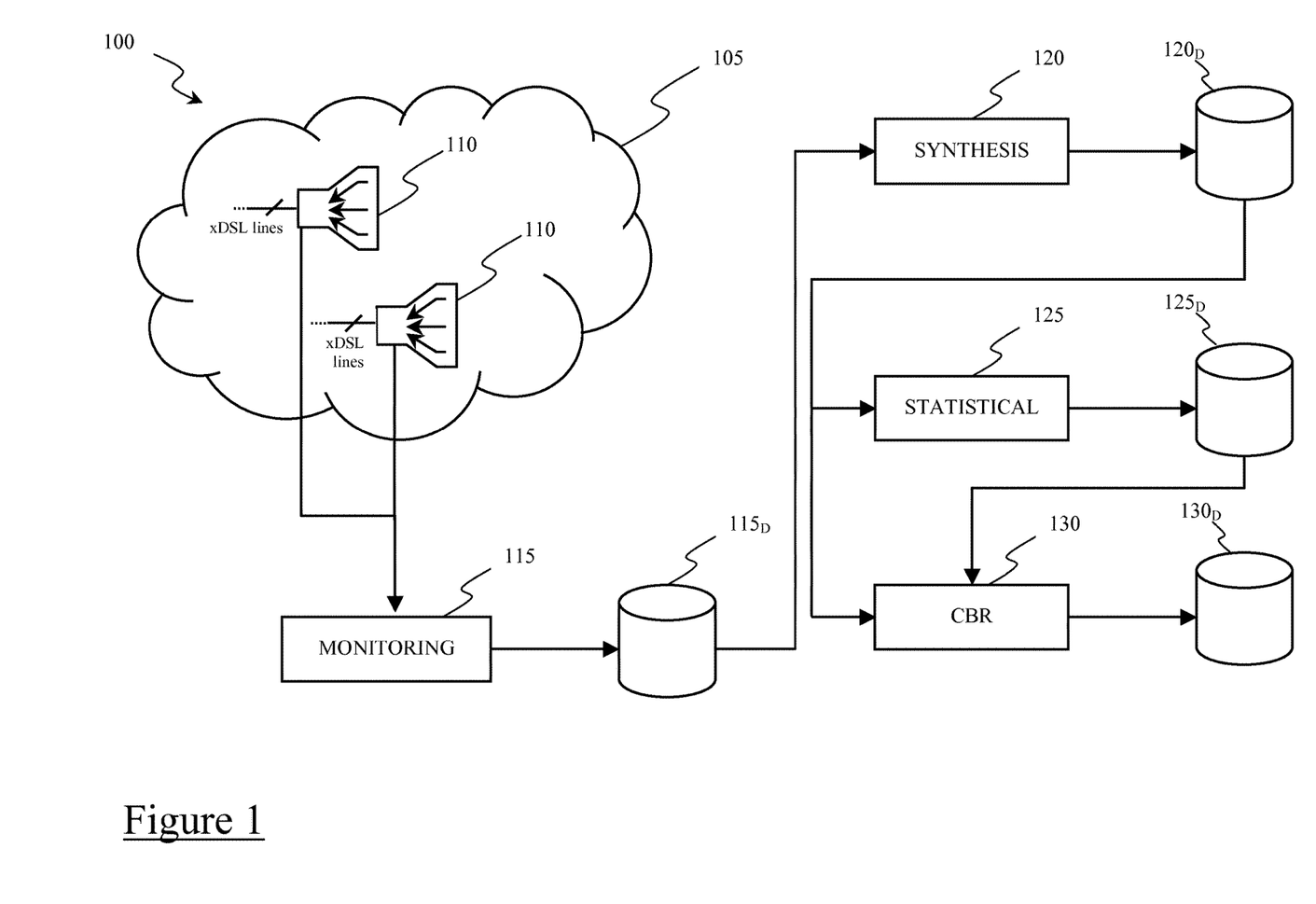
FIG. 1 shows a broadband communication system 100 according to an embodiment of the present invention.

With reference to the drawings, FIG. 1 shows, according to an embodiment of the present invention, a broadband communication system 100 comprising a plurality of broadband communication lines (such as ADSL, ADSL2, ADSL2+ or VDSL2 lines, hereinafter xDSL lines).

The broadband communication system 100 comprises an access network 105 including (e.g., twisted pair) cables (identifying respective xDSL lines) between customer premises equipment (not shown) and service provider plants, and "Digital Subscriber Line Access Multiplexer" (DSLAM) devices 110 (only two in the exemplary depicted figure) located at the service provider plants for providing broadband xDSL services over the xDSL lines.

Broadly speaking, the present invention is aimed at determining/evaluating/estimating a sustainable speed that can be sustained in the long term by (one or more) xDSL lines, so as to allow activation of xDSL services on xDSL lines only when xDSL service quality can be ensured over time.

The broadband communication system 100 comprises a monitoring module 115 (or more thereof, according to scalability and/or efficiency needs) for monitoring, at monitoring time instants and for each xDSL line, values of (one or more) operating parameters indicative of the operation of the xDSL line in the access network 105. According to the present invention, such operating parameters comprise the "Attainable Net Data Rate", which represents a maximum speed (bit rate) that can be attained over the xDSL line (or attainable speed) based on current noise conditions and cable attenuation (without constraints imposed by specific xDSL services). Preferably, as herein assumed by way of example only, the operating parameters also comprise the "Loop Attenuation", which represents the attenuation experienced by signals along the xDSL line (xDSL signals) between the service provider plant and the customer premise. "Loop Attenuation" monitoring may also be omitted in basic embodiments of the present invention, but it is advantageous for providing homogeneous xDSL lines grouping (as better understood in the following).

Preferably, the "Attainable Net Data Rate" and "Loop Attenuation" values are determined (e.g., estimated or measured) and updated independently by xDSL modems during operation thereof, and made available (e.g., for monitoring thereof) to "Management Information Bases" of the DSLAM devices 110, e.g. according to policies defined within ITU-T Recommendations relating to xDSL technology—for example: ITU-T G.992.3 Recommendation: "*Asymmetric digital subscriber line transceivers 2 (ADSL2)*", 2009-04; ITU-T G.993.2 Recommendation: "*Very high speed digital subscriber line transceivers 2 (VDSL2)*", 2011-12; ITU-T G.997.1 Recommendation: "*Physical layer management for digital subscriber line transceivers*", 2012-06). For each xDSL line, the "Attainable Net Data Rate" and "Loop Attenuation" values depend on a "loop makeup" of the xDSL line, namely on cable physical characteristics (e.g., type, cross-section, length and insulation) that affect the xDSL line speed (and hence the bandwidth available to the customer).

According to an embodiment of the present invention, "Attainable Net Data Rate" and "Loop Attenuation" values determining could be a "Dual Ended Line Testing" (DELT)-based measurement. With respect to reflectometry-based measurement which most of prior-art solutions make use of, DELT-based measurement needs no xDSL line out of servicing (reflectometry-based measurement instead do, especially when reflectometry-based measurement make use of the frequencies spectrum used for transmitting the xDSL signals—or XDSL frequencies spectrum), no interaction with the customer (reflectometry-based measurement instead do, as often reflectometry-based measurement is strongly influenced by the equipment at the customer premises), and no technician on the field.

Monitoring, by the monitoring module 115, of the (measured) "Attainable Net Data Rate" and "Loop Attenuation" values is preferably carried out by accessing the "Management Information Bases" of the DSLAM devices 110, e.g. by means of SNMP ("Simple Network Management Protocol") protocol (or by means of similar or equivalent protocols), and/or the xDSL modems, e.g. by means of the TR-069 protocol (or by means of similar or equivalent mechanisms, such as SNMP protocol or xDSL modems "Command Line Interface").

"Attainable Net Data Rate" and "Loop Attenuation" values monitoring may be, and advantageously is, independent from "Attainable Net Data Rate" and "Loop Attenuation" values measurement. In other words, "Attainable Net Data Rate" and "Loop Attenuation" monitoring and measurement are not necessarily synchronous with one another. Asynchrony between "Attainable Net Data Rate" and "Loop Attenuation" monitoring and measurement advantageously allows arbitrarily changing a monitoring frequency (i.e., a frequency with which the monitoring module 115 accesses the "Management Information Bases" of the DSLAM devices 110 and/or the xDSL modems), so that monitoring refinement may be arbitrarily chosen (e.g., according to the desired accuracy of the sustainable speed).

The broadband communication system 100 also comprises a value database $115_D$ for (e.g., chronologically) collecting/storing the "Attainable Net Data Rate" and "Loop Attenuation" values for each xDSL line, and allowing to retrieve the collected "Attainable Net Data Rate" and "Loop Attenuation" values associated with a specific xDSL line and with a specific monitoring time period (i.e., a time period/interval comprising a plurality (e.g., a predetermined number) of monitoring time instants wherein monitoring of the "Attainable Net Data Rate" and "Loop Attenuation" values and collection thereof into the value database $115_D$ take place).

Monitoring (and collection) frequency (determined by the length of the monitoring time period and by the number of monitoring time instants within it) is not limiting for the present invention, and is preferably chosen according to a tradeoff between processing capabilities of the monitoring module 115, storage capacity of the value database $115_D$ and number of values (samples) required to characterize the behavior of the xDSL lines in an adequately precise manner. According to an embodiment of the present invention, each record of the value database $115_D$ is associated with a respective xDSL line, and comprises:
- a xDSL line identifier LineID univocally identifying the xDSL line;
- the (monitored) "Attainable Net Data Rate" and "Loop Attenuation" values of the xDSL line;
- timestamp (including monitoring date, monitoring time period and monitoring time instants therewithin) of the "Loop Attenuation" and "Attainable Net Data Rate" values; and operating parameter name ("Attainable Net Data Rate" or "Loop Attenuation", in the example at issue) and direction (upstream or downstream).

The broadband communication system 100 further comprises a qualification system for determining the sustainable speed (or sustainable current bit rate, hereinafter sustainable CBR) that can be sustained by each xDSL line of the access network 105 (or of a portion thereof) in the long term, i.e. when noisy systems will saturate the access network 105 (or the corresponding access network portion)—by noisy systems for a given xDSL line meaning any systems that share, with that xDSL line, at least a portion of the xDSL frequency spectrum and a cable sector of the access network).

In order to achieve that, the qualification system preferably comprises:

- a synthesis module 120 for determining, for each active xDSL line whose "Attainable Net Data Rate" and "Loop Attenuation" values are collected in the value database 115$_D$, synthesis indicators associated with the "Attainable Net Data Rate" and "Loop Attenuation" values determined/measured for that xDSL line over the monitoring time period (as better discussed in the following), and a synthesis database 120$_D$ for (e.g., chronologically) collecting/storing the determined synthesis indicators;
- a statistical module 125 for determining, for each set/group of (one or more) xDSL lines whose synthesis indicators are collected in the synthesis database 120$_D$ (with possible xDSL lines grouping criteria that will be discussed in the following), a statistical indicator indicative of an expected maximum change of the "Attainable Net Data Rate" values (or, equivalently, as will be better understood from the following description, the expected maximum performance worsening affecting a xDSL line when noisy systems will saturate the access network 105 portion which that xDSL line belongs to), and a statistical database 125$_D$ for (e.g., chronologically) collecting/storing the determined statistical indicators; and
- a CBR module 130 for estimating, for each xDSL line (or, at least for each xDSL line for which activation of a new xDSL service has been requested), the sustainable CBR according to the respective "Attainable Net Data Rate" values and to the statistical indicator associated with the xDSL lines group which that xDSL line belongs to, and a CBR database 130$_D$ for (e.g., chronologically) collecting/storing the estimated sustainable CBR.

It is pointed out that the use of the term "module" is herein intended to emphasize functional (rather than implementation) aspects thereof. Indeed, without losing of generality, the monitoring 115, synthesis 120, statistical 125 and CBR 130 modules may be implemented by software (in which case, the resulting algorithm would be performed by proper code means included in a computer program, when the program is run on a computer), hardware, and/or a combination thereof. Moreover, the synthesis 120, statistical 125 and CBR 130 modules may also reflect, at least conceptually, the physical structure of the qualification system. However, the synthesis 120, statistical 125 and CBR 130 modules may have, by the physical viewpoint, distributed nature, it being understood that, by the logical viewpoint, the synthesis 120, statistical 125 and CBR 130 modules are all part of the qualification system, wherever (and in whichever way) their physical implementation takes place. Moreover, a different functionality splitting between the synthesis 120, statistical 125 and CBR 130 modules may be provided.

Figure 2:
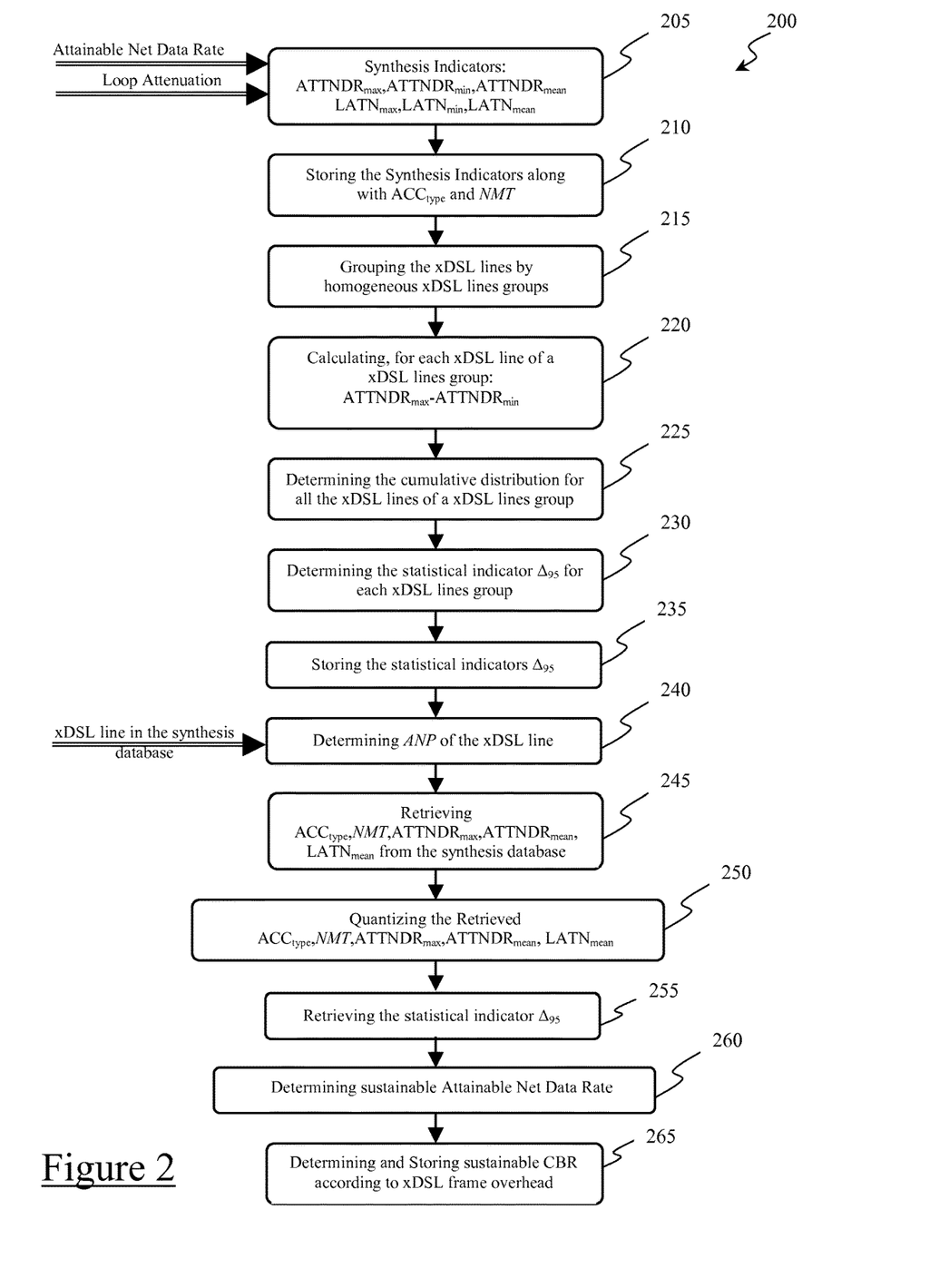
FIG. 2 shows an activity diagram illustrating main operation steps carried out by a qualification system of the broadband communication system according to an embodiment of the present invention.

In order to take into account both structural/physical and functional implementation of the qualification system, synthesis 120, statistical 125 and CBR 130 modules operation will be discussed jointly with FIG. 2, the latter showing an activity diagram 200 illustrating main operation steps carried out by the qualification system (regardless of its physical/structural implementation) according to an embodiment of the present invention.

As mentioned above, the synthesis module 120 is configured for determining (step 205), for each xDSL line whose "Attainable Net Data Rate" and "Loop Attenuation" values are collected in the value database 115$_D$, the synthesis indicators associated with the "Attainable Net Data Rate" and "Loop Attenuation" values determined/measured for that xDSL line over the monitoring time period. As will be understood from the following description of exemplary embodiments of the present invention, the synthesis indicators associated with the "Attainable Net Data Rate" values allow determining the "Attainable Net Data Rate" values changes affecting that xDSL line over the monitoring time period (whereas the synthesis indicators associated with the "Loop Attenuation" values allow quick and easy grouping of the xDSL lines). Indeed, for each xDSL line, the "Attainable Net Data Rate" values feature a certain degree of variability over time according to noise fluctuations affecting the xDSL line when respective noisy systems are switched on or off, and according to attenuation experienced by the xDSL signals along the xDSL line (i.e., the "Loop Attenuation"). In the absence of anomalies, "Loop Attenuation" values changes have a very limited extent, so that "Attainable Net Data Rate" values changes may be attributed mainly to noise fluctuations (as better discussed herebelow, this implies that, for each xDSL line, "Attainable Net Data Rate" values variations over a sufficiently long time period allow determining maximum and minimum noises affecting the xDSL line). Moreover, each xDSL line is associated with specific "Attainable Net Data Rate" values changes, depending on number of noisy systems for that xDSL line, on cable structural characteristics (e.g., type, cross-section, length and insulation) and on crosstalk between the twisted pairs within the cable (see for example "*Fundamentals of DSL Technology*" Cap 2-6, by Philip Golden, Hervé Dedieu, and Krista Jacobsen; Auerbach Publications 2005).

According to an embodiment of the present invention, for "Attainable Net Data Rate" and "Loop Attenuation" whose N values have been collected in the value database 115$_D$, the synthesis indicators comprise:

- a minimum value ATTNDR$_{min}$ of "Attainable Net Data Rate" over the N collected "Attainable Net Data Rate" values. In view of the above, if the N collected "Attainable Net Data Rate" values cover a sufficiently long monitoring time period (e.g., a few days), and assuming "Loop Attenuation" changes with very limited extent over that monitoring time period, the minimum value ATTNDR$_{min}$ of "Attainable Net Data Rate" of a given xDSL line provides a quite precise indication of the maximum noise that is expected on that xDSL line (i.e., when all noisy systems for that xDSL line are switched on);
- a maximum value ATTNDR$_{max}$ of "Attainable Net Data Rate" over the N collected "Attainable Net Data Rate" values. In view of the above, if the N collected "Attainable Net Data Rate" values cover a sufficiently long monitoring time period (e.g., a few days), and assuming "Loop Attenuation" changes with very limited extent over that monitoring time period, the maximum value ATTNDR$_{max}$ of "Attainable Net Data Rate" of a given xDSL line provides a quite precise indication of the minimum noise that is expected on that xDSL line (i.e., when all noisy systems for that xDSL line are switched off);

a mean value ATTNDR$_{mean}$ of "Attainable Net Data Rate" over the N collected "Attainable Net Data Rate" values;

a minimum value LATN$_{min}$ of "Loop Attenuation" over the N collected "Loop Attenuation" values;

a maximum value LATN$_{max}$ of "Loop Attenuation" over the N collected "Loop Attenuation" values;

a mean value LATN$_{mean}$ of "Loop Attenuation" over the N collected "Loop Attenuation" values;

Preferably, the synthesis indicators of each xDSL line are collected/stored (step 210) in the synthesis database 120$_D$ along with information about the xDSL service on that xDSL line, such as xDSL access type ACC$_{type}$ (i.e., a type of xDSL service according to one or more technical and performance categories such as, for example, ADSL, ADSL+, VDSL, etc.) and noise margin target NMT (i.e., a maximum noise increase that the xDSL line can withstand for guaranteeing a "Bit Error Ratio" equal to, or below, $10^{-7}$)—indeed, the "Attainable Net Data Rate" values depend on the xDSL frequencies spectrum (which in turn depends on the xDSL access type ACC$_{type}$) and are calculated with reference to a given noise margin target NMT.

The noise margin target NMT is typically set at 6 dB as a result of xDSL line noise and speed tradeoff, however an increased noise margin target NMT (e.g., equal to 9 or 12 dB) may be provided for problematic xDSL lines. Preferably, although not necessarily, the xDSL access type ACC$_{type}$ and the noise margin target NMT are obtained from an inventory database available to the xDSL service provider. Alternatively, the xDSL access type ACC$_{type}$ and noise margin target NMT may be directly collected from the DSLAM devices 110 (e.g., by readings xDSL configuration parameters from the "Management Information Bases" of the DSLAM devices 110).

Preferably, for each xDSL line, the synthesis indicators are determined by considering only "Attainable Net Data Rate" and "Loop Attenuation" values relating to the xDSL service (characterized in terms of xDSL access type ACC$_{type}$ and noise margin target NMT) that is actually activated on the xDSL line, and by disregarding (e.g., based on the timestamps stored in the value database 115$_D$) any "Attainable Net Data Rate" and "Loop Attenuation" values relating to previously activated and no longer active xDSL services—indeed, the xDSL access type ACC$_{type}$ and the noise margin target NMT may vary from xDSL service to xDSL service.

In view of the above, each record of the synthesis database 120$_D$ comprises, according to an embodiment of the present invention:

the xDSL line identifier LineID;

the xDSL access type ACC$_{type}$ and the noise margin target NMT of the xDSL line associated with the xDSL line identifier LineID;

operating parameter name ("Attainable Net Data Rate" and "Loop Attenuation", in the example at issue) and direction (upstream or downstream);

the synthesis indicators associated with the operating parameter (i.e., minimum ATTNDR$_{min}$, maximum ATTNDR$_{max}$ and mean ATTNDR$_{mean}$ values of "Attainable Net Data Rate", or minimum LATN$_{min}$, maximum LATN$_{max}$ and mean LATN$_{mean}$ values of "Loop Attenuation").

Synthesis database 120$_D$ updating is not limiting for the present invention. By way of example only, the synthesis database 120$_D$ may be updated periodically (e.g., every day, every week, and the like), indiscriminately/indistinctly for all the xDSL lines. Additionally or alternatively, the synthesis database 120$_D$ may be updated selectively for a given xDSL line as soon as a new record within the value database 120$_D$ is available for that xDSL line.

The statistical module 125 is aimed at grouping (step 215) the xDSL lines into lines groups (as better discussed herebelow, each xDSL lines group preferably comprising xDSL lines sharing at least one line property, or homogeneous xDSL lines, and associated with a same access network portion ANP), and at determining (steps 220-235 discussed in the following) a statistical indicator $\Delta_{95}$ for each xDSL lines group, the statistical indicator $\Delta_{95}$ for a xDSL lines group being indicative of an expected maximum change of the "Attainable Net Data Rate" values to be expected for all xDSL lines associated or associable with that xDSL lines group, and being based on a statistic of the "Attainable Net Data Rate" values changes affecting the xDSL lines of that xDSL lines group over the monitoring time period. Thus, with respect to prior art solutions making use of imprecise and poorly flexible predefined noise models, the present invention, by means of the statistical indicator $\Delta_{95}$, allows evaluating the sustainable CBR of a xDSL line with a statistical (hence, proven) accuracy, and with a high flexibility (as the statistical indicator $\Delta_{95}$ of each access network portion implicitly depends on the specific conditions of that access network portion).

According to an embodiment of the present invention, the statistical indicator $\Delta_{95}$ is a predetermined percentile of the cumulative distribution of the "Attainable Net Data Rate" values changes of the xDSL lines of a respective xDSL lines group—as better discussed in the following, the "Attainable Net Data Rate" values changes for each xDSL line being determined, for example, according to a difference between the maximum ATTNDR$_{max}$ and minimum ATTNDR$_{min}$ values of "Attainable Net Data Rate" of that xDSL line.

The predetermined percentile to be considered for the statistical indicator $\Delta_{95}$ is not limiting for the present invention. Advantageously, it is sufficiently high to determine the highest changes of the "Attainable Net Data Rate" values that can be expected in the respective access network portion ANP wherein deployment of broadband xDSL lines and services has already reached a significant penetration, and sufficiently low to exclude (from the statistics) those "Attainable Net Data Rate" values large changes that are not attributable to switching on/off of the noisy systems, but to (usually discontinuous) infrastructure issues and/or external noise (i.e., noise external to the cable). Preferably, the predetermined percentile is between the 85-th and 97-th percentiles, and even more preferably between the 90-th and 96-th percentiles. In the example at issue, the 95-th percentile will be considered, it meaning that the statistical indicator $\Delta_{95}$ determined for each xDSL lines group represents the maximum "Attainable Net Data Rate" values change that can be expected in 95% of the xDSL lines of that group (or, equivalently, the maximum performance worsening that is expected to affect the 95% of the xDSL line when noisy systems saturation takes place in the considered access network portion ANP).

As mentioned above, each xDSL lines group comprises homogeneous xDSL lines associated with a same access network portion ANP. Grouping of the (homogeneous) xDSL lines by associated (e.g., taken) access network portions ANP allows accurately estimating the sustainable CBRs, namely the sustainable CBRs that are valid for the specific conditions of that access network portion ANP.

Association (criterion) of each xDSL line to the respective access network portion ANP may be based on information typically available by xDSL service providers (such as customer address, customer phone identifier, and/or xDSL access type $ACC_{type}$). Type and number of access network portions ANP is not limiting for the present invention, and may be arbitrarily chosen according to design parameters (e.g., when a number of xDSL lines should be included that allows determining the statistical indicator $\Delta_{95}$ with sufficient high statistical confidence) or to particular conditions (e.g., when one or more access network portions ANP exist whose features are not replicated on other access network portions ANP).

According to an embodiment of the present invention, the at least one line property (according to which homogeneous xDSL lines groups are determined) comprises the mean value $ATTNDR_{mean}$ of the Attainable Net Data Rate and, preferably, at least one (and, even more preferably, as herein exemplary assumed, all) among:
  xDSL access type $ACC_{type}$ and noise margin target NMT (indeed, "Attainable Net Data Rate" values refer to a specific noise margin target NMT and to a specific xDSL frequencies spectrum); and
  mean value $LATN_{mean}$ of "Loop Attenuation".

Even more preferably, due to high resolutions of the mean values $ATTNDR_{mean}$ of "Attainable Net Data Rate" and, when considered, of the mean values $LATN_{mean}$ of "Loop Attenuation", said grouping is based on discretized/quantized mean values $ATTNDR_{mean,q}$ of "Attainable Net Data Rate" and on discretized/quantized mean values $LATN_{mean,q}$ of "Loop Attenuation" (with the discretization step, not shown, that may be carried out according to any predetermined quantization criterion).

For example, assuming that the synthesis database $120_D$ contains, for the xDSL lines of a same access network portion ANP, the following data:

| LineID | $ACC_{type}$ | NMT | $ATTNDR_{mean}$ | $LATN_{mean}$ |
|---|---|---|---|---|
| A | ADSL | 6 | 6144 | 15.2 |
| B | ADSL2+ | 9 | 14652 | 18.4 |
| C | ADSL | 6 | 7822 | 15.8 |
| D | ADSL2+ | 9 | 15428 | 18.6 |
| E | ADSL2+ | 9 | 20184 | 18.9 | and that discretization operation of the mean values $ATTNDR_{mean}$ of "Attainable Net Data Rate" takes place based on a 2000 Kb/s steps and that discretization of the mean values $LATN_{mean}$ of "Loop Attenuation" takes place based on a 1 dB step, the resulting quantized mean values $ATTNDR_{mean,q}$ of "Attainable Net Data Rate" and quantized mean values $LATN_{mean,q}$ of "Loop Attenuation" are the following:

| LineID | $ACC_{type}$ | NMT | $ATTNDR_q$ | $LATN_q$ |
|---|---|---|---|---|
| A | ADSL | 6 | 6000 | 15 |
| B | ADSL2+ | 9 | 14000 | 18 |
| C | ADSL | 6 | 6000 | 15 |
| D | ADSL2+ | 9 | 14000 | 18 |
| E | ADSL2+ | 9 | 20000 | 18 | and the xDSL lines within the considered access network portion ANP are grouped into groups (three groups in the example at issue) of xDSL lines having homogeneous xDSL access type $ACC_{type}$, noise margin target NMT, quantized mean values $ATTNDR_{mean,q}$ of "Attainable Net Data Rate" and quantized mean values $LATN_{mean,q}$ of "Loop Attenuation". In the example at issue, the xDSL lines groups are the following:
  A and C xDSL lines
  B and D xDSL lines
    xDSL line E For each xDSL lines group, and hence for each xDSL line featuring same xDSL access type $ACC_{type}$, noise margin target NMT, quantized mean values $ATTNDR_{mean,q}$ of "Attainable Net Data Rate" and quantized mean values $LATN_{mean,q}$ of "Loop Attenuation", the statistical module 125 determines the respective statistical indicator $\Delta_{95}$. This is preferably achieved, for each xDSL lines group, by:
  a) calculating, for each xDSL line, the experienced "Attainable Net Data Rate" change, e.g. in terms of a difference between maximum $ATTNDR_{max}$ and minimum $ATTNDR_{min}$ values of "Attainable Net Data Rate"—step 220;
  b) determining the cumulative distribution of the experienced "Attainable Net Data Rate" changes of all xDSL lines of the xDSL lines group—step 225; and
  c) determining, e.g. by means of common techniques or software tools, the statistical indicator $\Delta_{95}$ (e.g., the 95-th percentile) of the cumulative distribution (step 230), and storing it (step 235) in the statistical database $125_D$ (together with the associated xDSL access type $ACC_{type}$, noise margin target NMT, quantized mean value $ATTNDR_{mean,q}$ of "Attainable Net Data Rate" and quantized mean value $LATN_{mean,q}$ of "Loop Attenuation"). Preferably, if for a specific combination of xDSL access type $ACC_{type}$, noise margin target NMT, quantized mean value $ATTNDR_{mean,q}$ of "Attainable Net Data Rate" and quantized mean value $LATN_{mean,q}$ of "Loop Attenuation" it is not possible to determine the corresponding statistical indicator $\Delta_{95}$ (e.g., due to a number of xDSL lines not sufficient to reach the desired statistical confidence or to some missing data), the statistical indicator $\Delta_{95}$ or the missing data may be estimated by using data associated with other combinations (and for which determination of the statistical indicator has been possible). By way of example only, in the case of missing noise margin target NMT, the "Attainable Net Data Rate" values referring to other noise margin target NMT of other xDSL lines may be used to estimate the missing values thereof through techniques known to those skilled in the art (see, for example: ETSI ETSI TR 101 830-2, "*Transmission and Multiplexing (TM); Access networks; Spectral management on metallic access networks; Part 2: Technical methods for performance evaluations*", 2008-08), or in the case of missing access network portion information, information about other access network portions may be used (for example, if the access network portion ANP is/comprises a city, data associated with urban areas similar in terms of access network properties, e.g., access network extent, number of deployed broadband systems).

Thus, at the end of the statistical module 125 operation, the statistical database $125_D$ contains a specific statistical indicator $\Delta_{95}$ (e.g., in kbit/s) for each combination of access network portion ANP, xDSL access type $ACC_{type}$, noise margin target NMT, quantized mean value $ATTNDR_{mean,q}$ of "Attainable Net Data Rate" and quantized mean value $LATN_{mean,q}$ of "Loop Attenuation". An example of such a statistical database $125_D$ may be the following:

| ANP | ACC$_{type}$ | NMT | ATTNDR$_{mean,q}$ | LATN$_{mean,q}$ | Δ$_{95}$ |
|---|---|---|---|---|---|
| CentralOfficeA | ADSL2+ | 6 | 12000 | 10 | 2000 |
| CentralOfficeA | ADSL2+ | 6 | 15000 | 10 | 3200 |
| CentralOfficeA | ADSL2+ | 6 | 8000 | 15 | 1500 |
| CentralOfficeA | ADSL2+ | 6 | 6000 | 20 | 800 |
| ... | ... | ... | ... | ... | ... |
| CentralOfficeB | ADSL2+ | 9 | 18000 | 10 | 4700 |
| ... | ... | ... | ... | ... | ... |

Statistical database $125_D$ updating is not limiting for the present invention. By way of example only, it may be updated regularly (e.g., every month) or when the data within the synthesis database $120_D$ are significantly different from those from which the statistical indicators $Δ_{95}$ have been evaluated (circumstance that may arise as a result of technological evolution and periodic infrastructure upgrades, such as replacement of the broadband systems or of the cables of the access network). As a general consideration, the smaller access network portions for which the statistical indicators have been evaluated, the more frequent the statistical database $125_D$ updating (indeed, the "Attainable Net Data Rate" values of xDSL lines associated with an access network portion, such as a central office, are more frequently subject to changes with respect to the xDSL lines associated with a city or with an entire access network).

The CBR module 130 allows estimating the sustainable CBR for each xDSL line (or at least for each xDSL line for which activation of a new xDSL service has been requested) according to the respective data in the synthesis database $120_D$ and to the respective statistical indicator $Δ_{95}$ in the statistical database $125_D$. According to an embodiment of the present invention, for each xDSL line, the CBR module 130 is configured for:

determining (step 240) the access network portion ANP which the xDSL line belongs to, said determining being based on the same association (criterion) used at the statistical module 125 (so as to ensure correct matching between the synthesis $120_D$ and statistical $125_D$ databases data);

retrieving (step 245), from the synthesis module 120, xDSL access type ACC$_{type}$, noise margin target NMT, maximum ATTNDR$_{max}$ and mean ATTNDR$_{mean}$ values of "Attainable Net Data Rate", and mean value LATN$_{mean}$ of "Loop Attenuation" of that xDSL line. It should be noted that, depending on synthesis $120_D$ and statistical $125_D$ databases updating timing, at this step the xDSL access type ACC$_{type}$, the noise margin target NMT, the maximum ATTNDR$_{max}$ and mean ATTNDR$_{mean}$ values of "Attainable Net Data Rate", and the mean value LATN$_{mean}$ of "Loop Attenuation" of the xDSL line may also differ from those being used for determining the respective statistical indicator $Δ_{95}$ (i.e., they are the current ones), as meanwhile updating thereof without updating of the respective statistical indicator $Δ_{95}$ could have occurred. It should also be noted that the step 240, the step 245 and the following step 250 descend from the specific, not limiting, structure (i.e., data content) of the synthesis $120_D$ and statistical $125_D$ databases herein discussed (anyway these steps might also be omitted in different embodiments, e.g. wherein the statistical indicator $Δ_{95}$ are stored/collected and updated in the statistical database $125_D$ along with and directly associated with the synthesis indicators of the respective xDSL lines);

determining (step 250) the quantized (current) mean value ATTNDR$_{mean,q}$ of "Attainable Net Data Rate" and the quantized (current) mean value LATN$_{mean,q}$ of "Loop Attenuation", said determining being based on the same quantization criterion (discussed above) used for determining the statistical indicator $Δ_{95}$ (so as to ensure correct matching between the synthesis $120_D$ and statistical $125_D$ databases data);

retrieving (step 255), from the statistical module 125, the statistical indicator $Δ_{95}$ estimated for that (current) combination of access network portion ANP, (current) xDSL access type ACC$_{type}$, (current) noise margin target NMT, quantized (current) mean value ATTNDR$_{mean,q}$ of "Attainable Net Data Rate" and quantized (current) mean value LATN$_{mean,q}$ of "Loop Attenuation";

determining (step 260) a sustainable "Attainable Net Data Rate" that can be sustained in the long term by subtracting from the (current) maximum value ATTNDR$_{max}$ of "Attainable Net Data Rate" (the maximum value ATTNDR$_{max}$ of "Attainable Net Data Rate" providing, as discussed above, an indication of the minimum noise that is expected on the xDSL line when all noisy systems for that xDSL line are switched off) the retrieved statistical indicator $Δ_{95}$ (providing, as mentioned above, an indication of the maximum expected worsening of the xDSL line that has to be expected when significant penetration of the broadband communication systems arises in the access network portion ANP which the xDSL line belongs to);

determining (step 265) the sustainable CBR according to the sustainable "Attainable Net Data Rate" and according to an amount that takes into account a xDSL frame overhead (hereinafter, xDSL frame overhead amount, and resulting from Trellis coding and/or from Forward Error Correction and Interleaving techniques). Preferably, the sustainable CBR is determined by subtracting, from the sustainable "Attainable Net Data Rate", the xDSL frame overhead amount, with said xDSL frame overhead amount that is preferably determined according to ITU-T/ETSI standards (see for example ETSI ETSI TR 101 830-2: "Transmission and Multiplexing (TM); Access networks; Spectral management on metallic access networks; Part 2: Technical methods for performance evaluations", 2008-08); and collecting/storing (step 265) the sustainable CBR in the CBR database $130_D$. The CBR database $130_D$ (as well as the associated step 260) is preferred especially when, as herein assumed by way of example only, the sustainable CBR is estimated and updated indistinctly for all xDSL lines (e.g., so that the CBR database $130_D$ can be accessed when assessing whether a xDSL service can be activated on a xDSL line)—anyway, as should be understood, the CBR database $130_D$ (as well as the associated step 260) may also be omitted when the sustainable CBR is "real time" estimated (only) for each xDSL line for which a new xDSL service is requested.

Thus, when a customer requests a new xDSL service different from the xDSL service currently active on the xDSL line, the xDSL service provider may check whether the xDSL line is "adequate" to the new xDSL service, e.g. by checking that the features of the new xDSL service are compatible with the stored sustainable CBR for the xDSL line in the CBR database $130_D$ (i.e. by verifying that the sustainable CBR over time is greater than a minimum speed for guaranteeing the xDSL service). If the compatibility check is successful, provisioning of the new xDSL service on the customer xDSL line can take place, otherwise the customer is informed about the impossibility of activating the new xDSL service.

CBR database $130_D$ updating is not limiting for the present invention. By way of example only, the CBR database $130_D$ may be updated (by recalculating the sustainable CBRs for all the xDSL lines) when every set of (one or more) new statistical indicators $\Delta_{95}$ are provided in the statistical database $125_D$, or when the synthesis database $120_D$ is updated.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the broadband communication system has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to a broadband communication system based on xDSL technology and on twisted pair cable, it should be understood that it is not in the intentions of the Applicant to be limited to the implementation of any particular communication system architecture or protocol. In this respect, it is also possible to provide that, with suitable simple modifications, the proposed allocation procedure may be applied also to other broadband communication systems, such as wireless broadband communication systems or broadband communication systems based on optical fiber.

The invention claimed is:

1. A method for estimating, in a broadband communication system comprising an access network and a plurality of broadband communication lines associated with the access network, a sustainable speed that can be sustained by a selected broadband communication line of said plurality, the method comprising:

for each broadband communication line of said plurality of broadband communication lines, monitoring, at monitoring time instants, an attainable speed that can be attained over the line;

for each broadband communication line of said plurality of broadband communication lines, determining an attainable speed change that affects the broadband communication line over a monitoring time period comprising a plurality of said monitoring time instants;

grouping the broadband communication lines of said plurality of broadband communication lines into lines groups, each lines group comprising lines associated with a same access network portion and sharing at least one line property;

determining, for each lines group, an expected maximum attainable speed change based on a statistic of the attainable speed changes that affect the broadband communication lines of the lines group over said monitoring time period; and estimating the sustainable speed of the selected broadband communication line based on the respective attainable speeds monitored at said plurality of said monitoring time instants of said monitoring time period, and on the expected maximum attainable speed change determined for the lines group to which the selected broadband communication line belongs.

2. The method according to claim 1, wherein said determining, for each lines group, an expected maximum attainable speed change comprises:

determining a cumulative distribution of the attainable speeds changes of the broadband communication lines of the lines group, and determining a predefined percentile of said cumulative distribution.

3. The method according to claim 2, wherein said determining an attainable speed change that affect the broadband communication line over a monitoring time period comprises determining, among the attainable speeds monitored over said monitoring time period, minimum and maximum attainable speeds, and wherein said determining, for each lines group, an expected maximum attainable speed change comprises determining, for each broadband communication line of the lines group, a difference between said maximum and minimum attainable speeds, said determining a cumulative distribution of the attainable speeds changes of the broadband communication lines of the lines group comprising determining a cumulative distribution of the differences between said maximum and minimum attainable speeds of the broadband communication lines of the lines group.

4. The method according to claim 3, wherein said estimating the sustainable speed of the selected broadband communication line comprises:

subtracting the expected maximum attainable speed change of the lines group to which the selected broadband communication line belongs from the maximum attainable speed of the selected broadband communication line.

5. The method according to claim 4, wherein said estimating the sustainable speed of the selected broadband communication line comprises, after said subtracting:

applying a frame overhead associated with the selected broadband communication line.

6. The method according to claim 1, wherein said at least one line property comprises a mean attainable speed of the broadband communication line.

7. The method according to claim 6, wherein said at least one line property further comprises at least one of:

access type and noise margin target of the broadband communication line; and mean attenuation of the broadband communication line.

8. The method according to claim 1, wherein said grouping the broadband communication lines of said plurality of broadband communication lines into lines groups comprises providing a quantized mean attainable speed for each broadband communication line of said plurality of broadband communication lines, said at least one line property comprising said quantized mean attainable speed of the broadband communication line.

9. The method according to claim 8, wherein said grouping the broadband communication lines of said plurality of broadband communication lines into lines groups further comprises providing a quantized mean attenuation for each broadband communication line of said plurality of broadband communication lines, and wherein said at least one line property further comprises said quantized mean attenuation of the broadband communication line.

10. The method according to claim 8, wherein said at least one line property further comprises access type and noise margin target of the broadband communication line.

11. The method according to claim 1, wherein said monitoring is carried out by accessing "Management Information Bases" of DSLAM devices of the broadband communication system.

12. A non-transitory computer-readable medium encoded with computer-readable instructions that, when executed by a computer, cause the computer to to perform the method of claim 1.

13. A broadband communication system comprising:
an access network;
a plurality of broadband communication lines associated with the access network; and
a computer configured to:
monitor, at monitoring time instants, an attainable speed that can be attained over each broadband communication line of said plurality of broadband communication lines,
determine, for each broadband communication line of said plurality of broadband communication lines, an attainable speed change that affects the broadband communication line over a monitoring time period comprising a plurality of monitoring time instants,
group the broadband communication lines of said plurality of broadband communication lines into lines groups, each lines group comprising broadband communication lines associated with a same access network portion and sharing at least one line property, and determine, for each lines group, an expected maximum attainable speed change based on a statistic of the attainable speed changes that affect the broadband communication lines of the lines group over said monitoring time period, and
estimate a sustainable speed of a selected broadband communication line of said plurality of broadband communication lines based on the attainable speeds monitored at said plurality of said monitoring time instants of said monitoring time period for the selected broadband communication line, and on the expected maximum attainable speed change determined for the lines group to which the selected broadband communication line belongs.

\* \* \* \* \*